(12) United States Patent
Kuo

(10) Patent No.: US 8,870,113 B2
(45) Date of Patent: Oct. 28, 2014

(54) DUAL-DIRECTION POSITIONING DEVICE

(71) Applicant: TSC Auto ID Technology Co., Ltd., Taipei (TW)

(72) Inventor: Shang-Shih Kuo, Taipei (TW)

(73) Assignee: TSC Auto ID Technology Co., Ltd., Taipei (TW)

( * ) Notice: Subject to any disclaimer, the term of this patent is extended or adjusted under 35 U.S.C. 154(b) by 0 days.

(21) Appl. No.: 13/849,612

(22) Filed: Mar. 25, 2013

(65) Prior Publication Data

US 2014/0284182 A1 Sep. 25, 2014

(51) Int. Cl.
*B65H 16/06* (2006.01)
*B41J 15/02* (2006.01)
*B65G 13/12* (2006.01)

(52) U.S. Cl.
CPC ..................................... *B65G 13/12* (2013.01)
USPC .................... 242/578; 242/596.8; 400/613

(58) Field of Classification Search
CPC .......... B65H 16/06; B65H 18/06; B41J 15/02
USPC .......... 242/578, 596.8; 400/120.16, 611, 613; 198/780, 860.1, 861.1
See application file for complete search history.

(56) References Cited

U.S. PATENT DOCUMENTS

| | | | | |
|---|---|---|---|---|
| 4,105,168 | A * | 8/1978 | Rutherford | 242/596.1 |
| 5,813,343 | A * | 9/1998 | Harb | 101/407.1 |
| 6,622,622 | B2 * | 9/2003 | Lee et al. | 101/228 |
| 6,695,500 | B2 * | 2/2004 | Kim et al. | 400/613 |
| 7,004,462 | B2 * | 2/2006 | Bryer | 271/171 |
| 7,018,119 | B2 * | 3/2006 | Koyabu | 400/242 |
| 7,232,268 | B2 * | 6/2007 | Sugimoto et al. | 400/242 |
| 7,350,992 | B2 * | 4/2008 | Ward | 400/196 |
| 7,824,116 | B2 * | 11/2010 | Lyman | 400/613 |
| 8,177,446 | B2 * | 5/2012 | Kuo et al. | 400/693.1 |
| 8,182,163 | B2 * | 5/2012 | Kuo et al. | 400/619 |
| 8,616,793 | B2 * | 12/2013 | Kasugai et al. | 400/613 |

* cited by examiner

*Primary Examiner* — Douglas Hess
(74) *Attorney, Agent, or Firm* — Rosenberg, Klein & Lee

(57) ABSTRACT

A dual-direction positioning device includes a main body, a first clamping structure, a second clamping structure, a first swing arm, a second swing arm, a coupling unit, and a first elastic element. The main body has a guiding trench portion. The first clamping structure and the second clamping structure are to and fro movably assembled to the guiding trench portion. The first swing arm is rotatably assembled on the first clamping structure and has a first engaging portion. The second swing arm is rotatably assembled on the second clamping structure and has a second engaging portion. The first engaging portion and the second engaging portion are rotatably assembled on the coupling unit and engaged with each other. The first elastic element has a first fixed end located between the first clamping structure and the second clamping structure and a first connecting end located on the first clamping structure.

8 Claims, 7 Drawing Sheets

DUAL-DIRECTION POSITIONING DEVICE

FIELD OF THE INVENTION

The present invention relates to a positioning device, and more particularly relates to a dual-direction positioning device utilizing the swing arm with the engaging portion and the elastic element to have the clamping structures move to and fro synchronously for clamping and positioning the roll.

BACKGROUND OF THE INVENTION

In the modern society glutted with electronic technologies, the applications of printing devices can be found everywhere in our daily lives. The barcode machine is broadly applied to various products and payment bills, and even for the logistics control of companies. In general, the barcode printers usually provide the paper, the carbon ribbon, or the color ribbon arranged by the way of a roll. The roll is usually arranged in the barcode printer by locating both ends of the roll in the positioning trenches or assembling a clamp to fix the roll directly.

The traditional positioning device is usually provided for a roll of a certain dimension. That is, the rolls of different dimensions cannot be fixed at the positioning device. if the roll is not properly fixed or becomes lighter because of the reduction of carrier (e.g. paper) on the roll, the pulling action on the carrier may result in the unwanted movements or shaking on the roll to generate deviation of printing position to reduce printing quality. For a barcode machine, such drawback will result in the recognition problem.

BRIEF SUMMARY OF INVENTION

In view of the above mentioned problem, because the traditional positioning device can only be used to locate a roll of a certain dimension in the positioning trenches and cannot be adopted to the rolls of different dimensions. In addition, if the roll is not properly fixed or becomes lighter because of the reduction of carrier (e.g. paper) on the roll, the pulling action on the carrier may result in the unwanted movements or shaking on the roll.

Accordingly, it is an object of the present invention to provide a dual-direction positioning device, which features the swing arms with the engaging portion and the elastic element to have the two clamping structure move synchronously for adjusting the distance between the two clamping structures to make the operation of clamping the roll more convenient. In addition, the lock slider with the lock portion and the rack structure corresponded to the lock portion assist the first clamping structure and the second clamping structure to position the roll more steadily.

The present invention provides a dual-direction positioning device, which includes a main body, a first clamping structure, a second clamping structure, a first swing arm, a second swing arm, a coupling unit, and a first elastic element. The main body has a guiding trench portion. The first clamping structure is to and fro movably assembled to the guiding trench portion along a first moving direction, and the second clamping structure is to and fro movably assembled to the guiding trench portion along a second moving direction, and the first moving direction is opposite to the second moving direction.

The first swing arm is rotatably assembled on the first clamping structure, and the first swing arm has a first engaging portion. The second swing arm is rotatably assembled on the second clamping structure, and the second swing arm has a second engaging portion. The first engaging portion and the second engaging portion are rotatably assembled on the coupling unit and engaged with each other within the coupling unit to have the first swing arm connecting to the second swing arm through the first engaging portion and the second engaging portion. The first elastic element has a first fixed end and a first connecting end. The first fixed end is located between the first clamping structure and the second clamping structure, and the first connecting end is located on the first clamping structure.

As mentioned above, when the first clamping structure moves along the first moving direction to drive the second clamping structure moves along the second moving direction by using the first swing arm and the second swing arm, the first elastic element generates an elastic recovery force to have the first clamping structure moves along the second moving direction and to have the second clamping structure moves along the first moving direction by using the first swing arm and the second swing arm so as to position the roll between the first clamping structure and the second clamping structure.

In accordance with a preferred embodiment of the present invention, the dual-direction positioning device further has a displacement-restricting element, the coupling unit has a displacement-restricting trench thereon, and the displacement-restricting element is assembled to the displacement-restricting trench and fixed on the main body to restrict a movement of the coupling unit. As a preferred embodiment, the displacement-restricting trench is extended along a third moving direction, which is perpendicular to the first moving direction and the second moving direction such that the coupling unit is restricted to be able to move along a direction perpendicular to the first moving direction and the second moving direction.

In accordance with a preferred embodiment of the present invention, the dual-direction positioning device further comprises a lock slider, which is movably assembled on the main body. The lock slider has a lock portion, and the coupling unit has a rack structure corresponded to the lock portion for an user to lock the coupling unit by using the lock slider. As a preferred embodiment, the dual-direction positioning device also has a positioning, which is assembled on the main body together with the lock slider for positioning the lock slider.

In accordance with a preferred embodiment of the present invention, the dual-direction positioning device further comprises a second elastic element, which has a second fixed end and a second connecting end, the second fixed end is located between the first clamping structure and the second clamping structure, and the second connecting end is located on the second clamping structure. As a preferred embodiment, the first fixed end and the second fixed end are overlapped and assembled to the main body to have the first elastic element and the second elastic element generate identical recovery forces to position the roll steadily when being pulled by the external force.

In accordance with a preferred embodiment of the present invention, the guiding trench portion includes a first guiding trench and a second guiding trench, the first clamping structure is to and fro movably assembled to the first guiding trench, and the second clamping structure is to and fro movably assembled to the second guiding trench.

Because the positioning device of prior art can only be used to locate a roll of a certain dimension in the positioning trenches and cannot be adopted to the rolls of different dimensions. In addition, if the roll is not properly fixed or becomes lighter because of the reduction of carrier (e.g. paper) on the roll, the pulling action on the carrier may result in the unwanted movements or shaking on the roll.

Accordingly, a dual-direction positioning device is provided in the present invention. The dual-direction positioning device adapts the engagement between the first engaging portion and the second engaging portion to connect the first swing arm and the second swing arm so as to have the first clamping structure and the second clamping structure move synchronously for adjusting the distance between the two clamping structures. Then, the extended first elastic element and the extended second elastic element are capable to generate recovery forces to clamp the roll. In addition, the dual-direction positioning device of the present invention also has the lock slider with the lock portion and the rack structure corresponded to the lock portion to assist the first clamping structure and the second clamping structure to position the roll more steadily.

The embodiments adopted in the present invention would be further discussed by using the flowing paragraph and the figures for a better understanding.

DETAILED DESCRIPTION OF THE INVENTION

There are various embodiments of the dual-direction positioning structure in accordance with the present invention, which are not repeated hereby. The preferred embodiment is mentioned in the following paragraph as an example. It should be understood by those skilled in the art that the preferred embodiments disclosed in the following paragraph are merely an example instead of restricting the scope of the invention itself.

Figure 1:
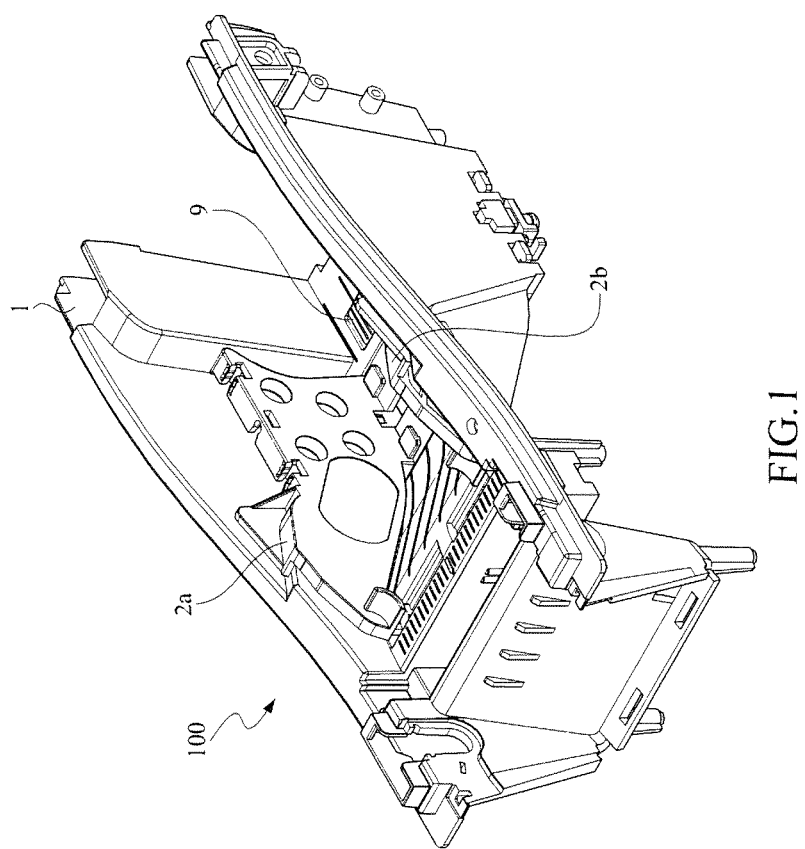
FIG. 1 is a schematic 3D view of the dual-direction positioning device in accordance with an embodiment of the present invention.
Figure 2:
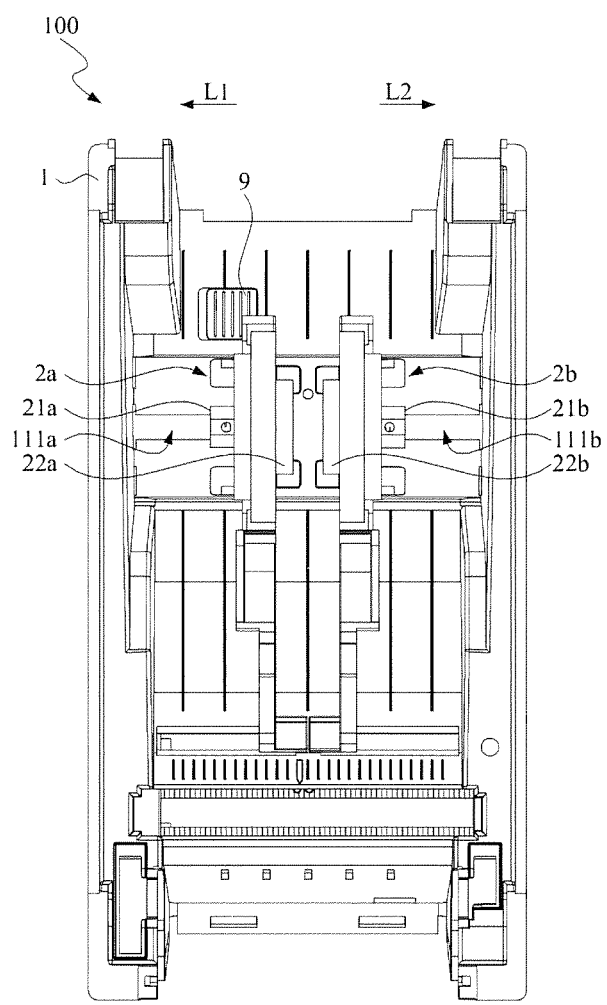
FIG. 2 is a front view of the dual-direction positioning device in accordance with an embodiment of the present invention.
Figure 3:
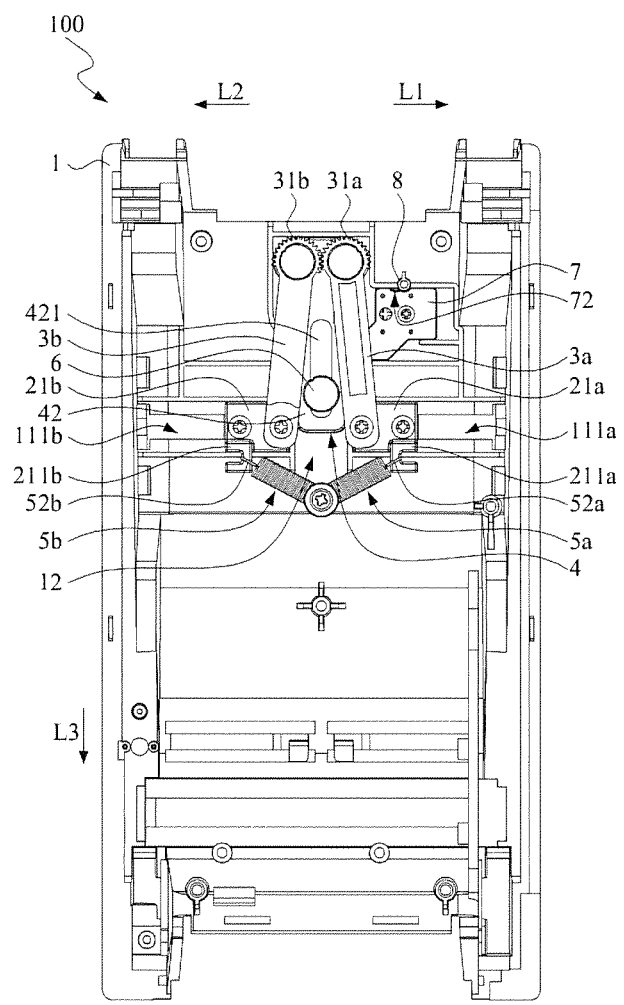
FIG. 3 is a back view of the dual-direction positioning device in accordance with an embodiment of the present invention.
Figure 4:
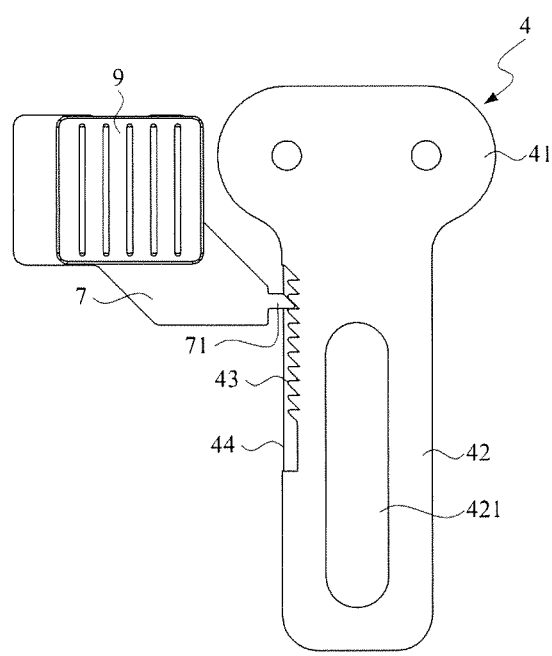
FIG. 4 is a schematic view showing the coupling unit and the lock slider of the dual-direction positioning device in accordance with an embodiment of the present invention.

Please refer to FIGS. 1 to 4, wherein FIG. 1 is a schematic 3D view of the dual-direction positioning device in accordance with an embodiment of the present invention, FIG. 2 is a front view of the dual-direction positioning device in accordance with an embodiment of the present invention, FIG. 3 is a back view of the dual-direction positioning device in accordance with an embodiment of the present invention, and FIG. 4 is a schematic view showing the coupling unit and the lock slider of the dual-direction positioning device in accordance with an embodiment of the present invention. As shown, the dual-direction positioning device 100 includes a main body 1, a first clamping structure 2a, a second clamping structure 2b, a first swing arm 3a, a second swing arm 3b, a coupling unit 4, a first elastic element 5a, a second elastic element 5b, a displacement-restricting element 6, a lock slider 7, a positioning unit 8, and a positioning button 9.

Figure 5:
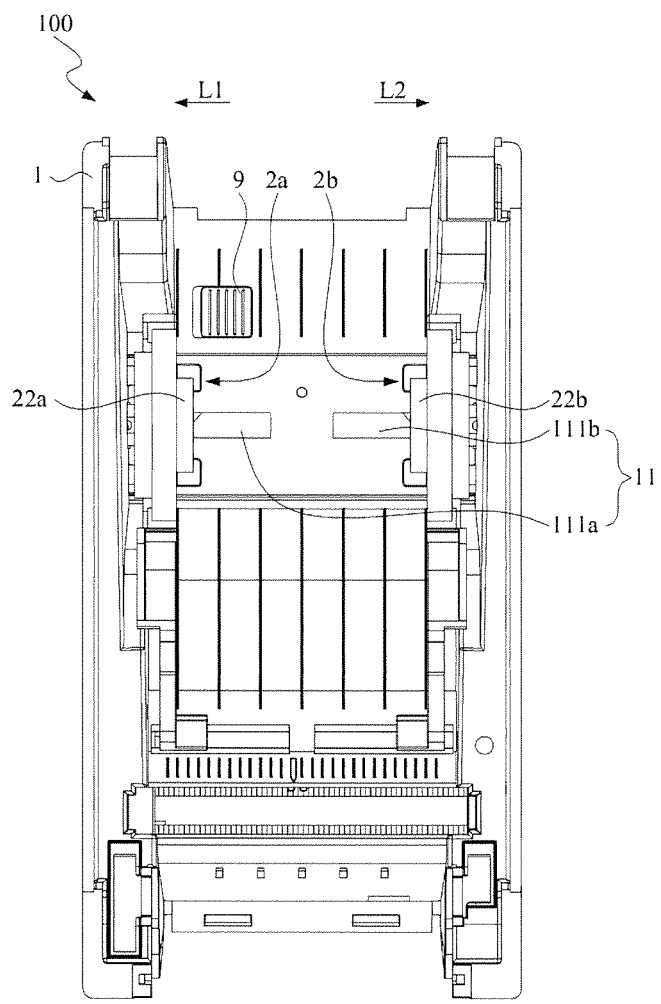
FIG. 5 is a schematic front view of the dual-direction positioning device with the clamping structures being separated in accordance with an embodiment of the present invention.
Figure 6:
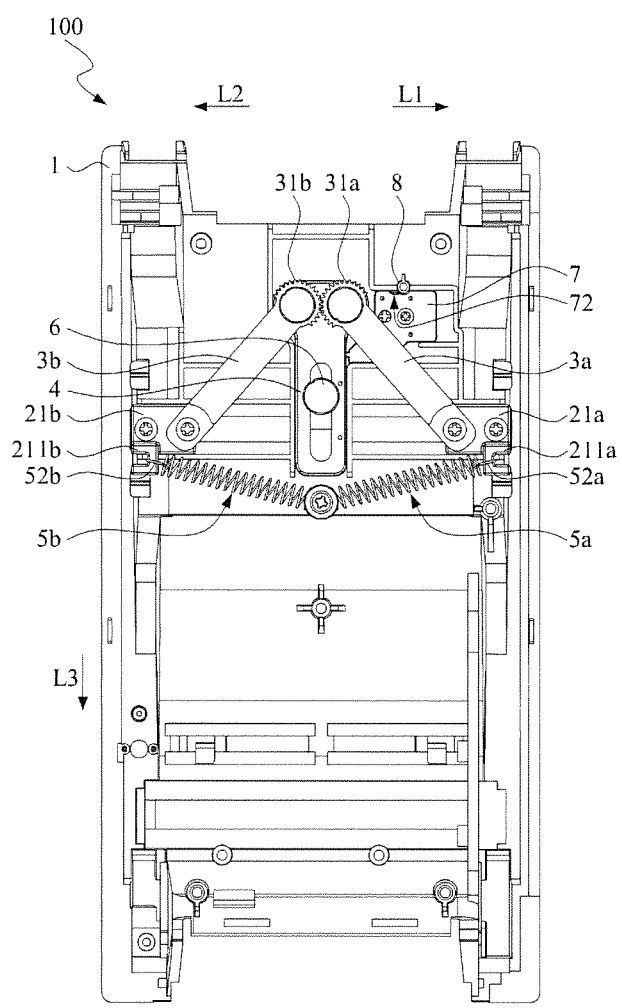
FIG. 6 is a schematic back view of the dual-direction positioning device with the clamping structures being separated in accordance with an embodiment of the present invention.

The main body has a guiding trench portion 11 (labeled in FIG. 5) and a accommodating trench 12 (labeled in FIG. 6). The guiding trench portion 11 further has a first guiding trench 111a and a second guiding trench 111b, and the accommodating trench 12 is located between the first guiding trench 111a and the second guiding trench 111b.

The first clamping structure 2a has a first coupling slider 21a and a first positioning protruding structure 22a (labeled in FIG. 2). The first coupling slider 21a is movably assembled in the first guiding trench 111a such that the first coupling slider 21a is capable to move to and fro along a first moving direction L1. The first coupling slider 21a also has a first hook portion 211a. The second clamping structure 2b has a second coupling slider 21b and a second positioning protruding structure 22b. The second coupling slider 21b is to and fro movably assembled in the second guiding trench 111b such that the second coupling slider 21b is capable to move to and fro along a second moving direction L2, which is opposite to the first moving direction L1. The second coupling slider 21b also has a second hook portion 211b. The first guiding trench 111a and the second guiding trench 111b are formed along an identical reference line (not shown) such that the first clamping structure 2a and the second clamping structure 2b are capable to move to and fro along the identical reference line.

The first swing arm 3a has a first engaging portion 31a, and the first swing arm 3a is rotatably assembled to the first coupling slider 21a of the first clamping structure 2a. The second swing arm 3b has a second engaging portion 31b, and the second swing arm 3b is rotatably assembled to the second coupling slider 21b of the second clamping structure 2b. The first engaging portion 31a is engaged with the second engaging portion 31b to have the first swing arm 3a connecting to the second swing arm 3b through the first engaging portion 31a and the second engaging portion 31b.

The coupling unit 4 includes a body 41, a displacement-restricting portion 42, a rack structure 43, and a stopper 44. The first engaging portion 31a and the second engaging portion 31b are engaged with each other and rotatably assembled to the body 41. The displacement-restricting portion 42 is extended from the body 41 along a third moving direction L3 perpendicular to the first moving direction L1 and the second moving direction L2, and movably assembled in the accommodating trench 12. The displacement-restricting portion 42 also has a displacement-restricting trench 421 formed thereon. The accommodating trench 12 is utilized for restricting the displacement-restricting portion 42 form moving to and fro along the third direction L3. The rack structure 43 is located on a sidewall of the displacement-restricting portion 42, and the stopper 44 is located by a side of the rack structure 43.

The first elastic element 5a has a first fixed end (not shown) and a first connecting end 52a. The first fixed end is located between the first clamping structure 2a and the second clamping structure 2b, and the first connecting end 52a is hooked by the first hook portion 211a. As a preferred embodiment, the first connecting end 52a is integrated to the rest of the first elastic element 5a as a whole. The second elastic element 5b has a second fixed end (not shown) and a second connecting end 52b. The second fixed end and the first fixed end are overlapped and assembled to the main body 1. The second connecting end 52b is hooked by the second hook portion 211b. As a preferred embodiment, the second connecting end 52b is integrated to the rest of the second elastic element 5b as a whole. In the present invention, the first elastic element 5a and the second elastic element 5b are the elastic elements with elastic recovery ability, such as the spring.

The displacement-restricting element 6 is assembled to the displacement-restricting trench 421 and fixed on the main body 1 to restrict a movement of the coupling unit 4 within the accommodating trench 12 along the third moving direction L3 so as to prevent the coupling unit 4 from escaping the accommodating trench 12 when moving.

The lock slider 7 is movably assembled in the main body 1 along the first moving direction L1. The lock slider 7 has a lock portion 71 and a positioning portion 72. The lock portion 71 is corresponded to the rack structure 43. The positioning portion 72 has two grooves (not labeled) formed thereon to assist the lock slider 7 to lock the coupling unit 4.

The positioning unit 8 is connected on the main body 1 and cooperates with the two grooves of the positioning portion 72. With the assistance of the positioning portion 72 and the positioning unit 8, the user may selectively lock the coupling unit 4 by using the lock portion 71. The positioning button 9 is connected to the siding block 7 such that the user may selectively operate the positioning button 9 to control the lock slider 7 to lock the coupling unit 4.

In the present embodiment, the rack structure 43 and the lock portion 71 are designed for single moving direction to prevent the lock portion 71 for locking the rack structure 43 from escaping its original plane. That is, as the rack structure 43 is locked, the first clamping structure 2a is only allowed to be pushed toward the first moving direction L1 and cannot be pushed toward the second moving direction L2. In addition, when the first clamping structure 2a is moving along the first moving direction L1, a noise of alarm is generated. Correspondingly, the second clamping structure 2b is only allowed to be pushed toward the second moving direction L2.

However, the present invention is not so restricted. In other embodiments of the present invention, the rack structure 43 and the lock portion 71 may be designed for dual moving direction. That is, as the rack structure 43 is locked. The user is allowed to push the first clamping structure 2a along either the first moving direction L1 or the second moving direction L2, but a noise of alarm would be generating when the first clamping structure 2a is moving.

Figure 7:
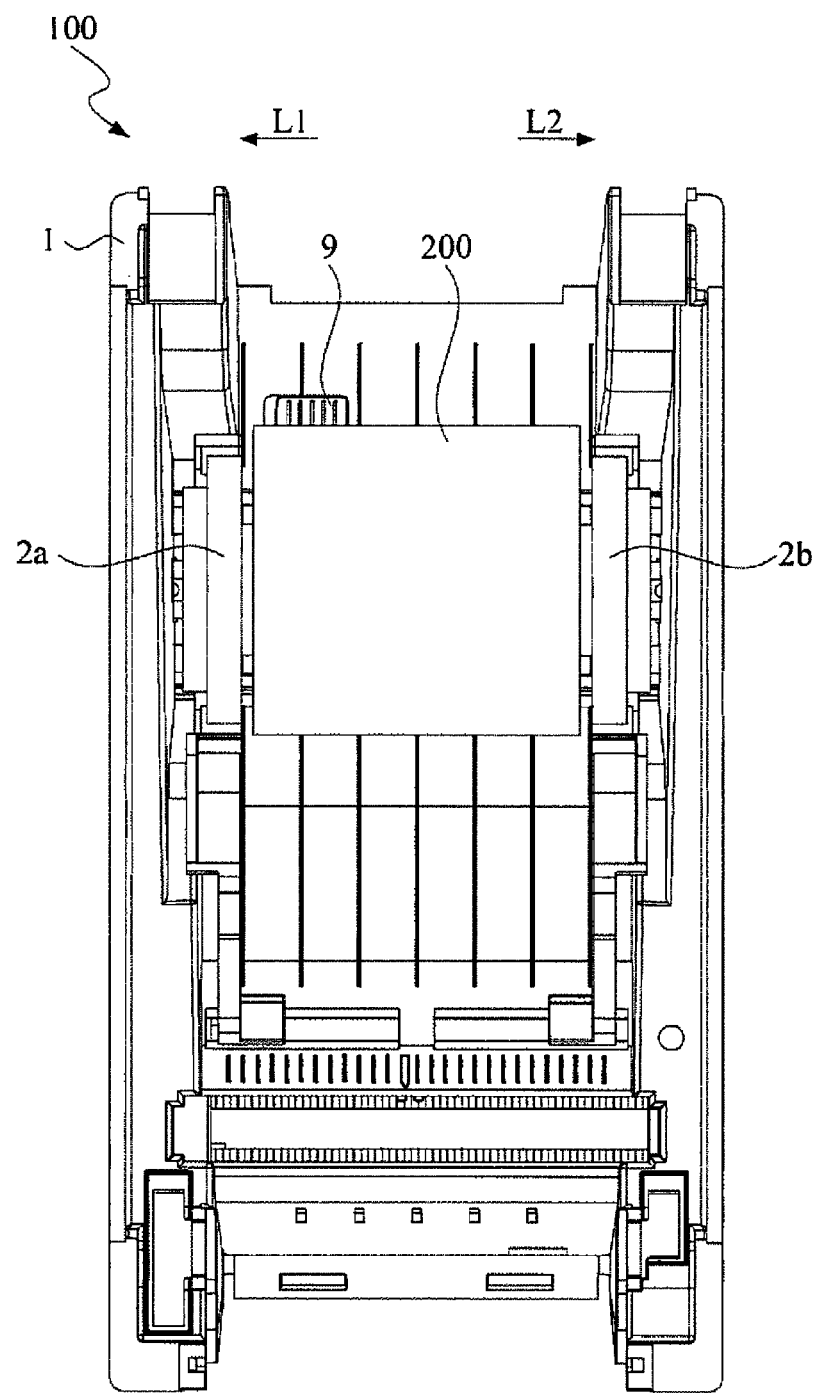
FIG. 7 is a schematic view showing the roll being positioned by using the dual-direction positioning device in accordance with an embodiment of the present invention.

Please refer to FIGS. 5 to 7, wherein FIG. 5 is a schematic front view of the dual-direction positioning device with the clamping structures being separated in accordance with an embodiment of the present invention, FIG. 6 is a schematic back view of the dual-direction positioning device with the clamping structures being separated in accordance with an embodiment of the present invention, and FIG. 7 is a schematic view showing the roll being positioned by using the dual-direction positioning device in accordance with an embodiment of the present invention. As shown, as the user wants to assemble the roll 200 in the dual-direction positioning device 100, he must push the first clamping structure 2a toward the first moving direction L1 to an adequate position for assembling the roll 200. Meanwhile, the first swing arm 3a connected to the first coupling slider 21a swings and transfers the movement to the second engaging portion 31b, which is engaged with the first engaging portion 31a, so as to swing the second swing arm 3b to move the second clamping structure 2b to an adequate position for assembling the roll 200 synchronously. The connection between the first swing arm 3a and the second swing arm 3b also has the coupling unit 4 moves along the third moving direction L3 in the accommodating trench 12. The movement of the coupling unit 4 is also restricted by the displacement-restricting element 6 assembled in the displacement-restricting trench 421.

The first clamping structure 2a and the second clamping structure 2b moves toward the first moving direction L1 and the second moving direction L2 respectively to extend the first elastic element 5a hooked by the first hook portion 211a and the second elastic element 5b hooked by the second hook portion 211b so as to generate the recovery forces toward the second moving direction L2 and the first moving direction L1 respectively for the first clamping structure 2a and the second clamping structure 2b to clamp the roll 200 and have the both ends of the roll 200 fixed by the first positioning protruding structure 22a and the second positioning protruding structure 22b.

As mentioned above, when the user moves the positioning button 9 toward the second moving direction L2, the lock slider 7 is driven to move toward the second moving direction L2 and the positioning unit 8 is locked at the corresponded positioning portion 72 to position the lock slider 7. At this time, the lock portion 71 is engaged with the rack structure 43 to position the first clamping structure 2a and the second clamping structure 2b. If the user keeps applying force to push the first clamping structure 2a toward the first moving direction L1, the coupling unit 4 will move toward the third moving direction L3 and engaged with the lock portion 71 to generate a noise of alarm to notice the user. On the contrary, when the user moves the positioning button 9 toward the first moving direction L1, the lock slider 7 is driven to move toward the first moving direction L1 and the positioning unit 8 is locked at the corresponded positioning portion 72 to position the lock slider 7. At this time, the engagement between the lock portion 71 and the rack structure 43 is released to have the first clamping structure 2a and the second clamping structure 2b back to their original position under the recovery forces generated by the first elastic element 5a and the second elastic element 5b.

In accordance with other preferred embodiments of the present invention, the coupling unit may have the body only and skip the displacement-restricting portion and the displacement-restricting element.

In accordance with other preferred embodiments of the present invention, the first swing arm and the second swing arm may be connected by a first elastic element directly to generate the recovery force to drive the first clamping structure and the second clamping structure.

In accordance with other preferred embodiments of the present invention, the dual-direction positioning device may have only the first elastic element and skip the second elastic element to generate the demanded recovery force to drive the first clamping structure and the second clamping structure.

In conclusion, in compared with the traditional positioning device, the dual-direction positioning device provided in accordance with the present invention is capable to utilized the synchronous rotation of the first swing arm and the second swing arm as well as the recovery forces generated by the first elastic element and the second elastic element to drive the first clamping structure and the second clamping structure synchronously for adjusting an adequate distance therebetween for clamping the roll. In addition, through the engagement between the lock slider with the lock portion and the rack structure of the coupling unit, the first clamping structure and the second clamping structure can position the roll more steadily.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A dual-direction positioning device, for positioning a roll, the dual-direction positioning device comprising:

a main body, having a guiding trench portion;

a first clamping structure, to and fro movably assembled to the guiding trench portion along a first moving direction;

a second clamping structure, to and fro movably assembled to the guiding trench portion along a second moving direction, and the first moving direction being opposite to the second moving direction;

a first swing arm, rotatably assembled on the first clamping structure, the first swing arm having a first engaging portion, and the first swing arm rotatable about the first engaging portion;

a second swing arm, rotatably assembled on the second clamping structure, the second swing arm having a second engaging portion, and the second swing arm rotatable about the second engaging portion;

a coupling unit, the first engaging portion and the second engaging portion being rotatably assembled and disposed on the coupling unit, the first engaging portion and the second engaging portion matingly engaged with each other to have the first swing arm connecting to the second swing arm through the first engaging portion and the second engaging portion; and a first elastic element, having a first fixed end and a first connecting end, the first fixed end being located between the first clamping structure and the second clamping structure, and the first connecting end being disposed on the first clamping structure;

wherein, when the first clamping structure moves along the first moving direction to drive the second clamping structure, the second clamping structure moves along the second moving direction by using the first swing arm and the second swing arm, the first elastic element generates an elastic recovery force to make the first clamping structure move along the second moving direction and to make the second clamping structure move along the first moving direction by using the first swing arm and the second swing arm so as to position the roll between the first clamping structure and the second clamping structure.

2. The dual-direction positioning device of claim 1, further comprising a displacement-restricting element, the coupling unit having a displacement-restricting trench thereon, and the displacement-restricting element being assembled to the displacement-restricting trench and fixed on the main body to restrict a movement of the coupling unit.

3. The dual-direction positioning device of claim 2, wherein the displacement-restricting trench is extended along a third moving direction, and the third moving direction is perpendicular to the first moving direction and the second moving direction.

4. The dual-direction positioning device of claim 1, further comprising a lock slider, movably assembled on the main body, the lock slider having a lock portion, and the coupling unit having a rack structure corresponding to the lock portion for a user to lock the coupling unit by using the lock slider.

5. The dual-direction positioning device of claim 4, further comprising a positioning unit, assembled on the main body together with the lock slider for positioning the lock slider.

6. The dual-direction positioning device of claim 1, further comprising a second elastic element, having a second fixed end and a second connecting end, the second fixed end being located between the first clamping structure and the second clamping structure, and the second connecting end being located on the second clamping structure.

7. The dual-direction positioning device of claim 6, wherein the first fixed end and the second fixed end are overlapped and assembled to the main body.

8. The dual-direction positioning device of claim 1, wherein the guiding trench portion further comprises a first guiding trench and a second guiding trench, the first clamping structure is to and fro movably assembled to the first guiding trench and the second clamping structure is to and fro movably assembled to the second guiding trench.

* * * * *